(12) United States Patent
Bayyouk et al.

(10) Patent No.: US 11,746,778 B2
(45) Date of Patent: Sep. 5, 2023

(54) FLUID END WITH INTEGRATED VALVE SEAT

(71) Applicant: SPM Oil & Gas Inc., Fort Worth, TX (US)

(72) Inventors: Jacob A. Bayyouk, Richardson, TX (US); Bryan Wagner, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 375 days.

(21) Appl. No.: 17/040,005

(22) PCT Filed: Mar. 27, 2019

(86) PCT No.: PCT/US2019/024350
§ 371 (c)(1),
(2) Date: Sep. 21, 2020

(87) PCT Pub. No.: WO2019/191276
PCT Pub. Date: Oct. 3, 2019

(65) Prior Publication Data
US 2021/0017982 A1 Jan. 21, 2021

Related U.S. Application Data

(60) Provisional application No. 62/649,436, filed on Mar. 28, 2018.

(51) Int. Cl.
*F04B 53/10* (2006.01)
*F16K 1/42* (2006.01)
(Continued)

(52) U.S. Cl.
CPC .......... *F04B 53/1087* (2013.01); *F04B 53/02* (2013.01); *F16K 1/42* (2013.01); *F16K 25/04* (2013.01)

(58) Field of Classification Search
CPC ........ F04B 53/1087; F04B 53/02; F16K 1/42; F16K 25/04
See application file for complete search history.

(56) References Cited

U.S. PATENT DOCUMENTS 1,709,807 A * 4/1929 Purnis ...................... F16K 1/42
123/188.8
2,101,970 A * 12/1937 Wissler ..................... F01L 3/22
123/188.8

(Continued)

OTHER PUBLICATIONS

International Search Report and Written Opinion for PCT/US2019/024350 dated Jun. 11, 2019, 10 pages.

*Primary Examiner* — Patrick C Williams
(74) *Attorney, Agent, or Firm* — Harrity & Harrity, LLP

(57) ABSTRACT

This disclosure presents a pump body, such as a fluid end housing used in a reciprocating pump, which provides an integral seating or engagement surface (or a valve seat integrated with the pump body) for a valve member. The integral engagement surface removes the need for a separate, replaceable valve seat and can last as long as the service life of the fluid end housing. This saves multiple maintenance services during the service life of the fluid end housing, along with the associated down time, labor costs, and material costs for the new valve seats. The integral engagement surface thus performs as an integral valve seat to the pump body. In some embodiments, the integral engagement surface may be coated, heat-treated, or otherwise modified to increase its wear resistance, such as by including one or more wear-resistant inserts to at least partially contact the valve member.

20 Claims, 6 Drawing Sheets

(51) Int. Cl.
*F16K 25/04* (2006.01)
*F04B 53/02* (2006.01)

(56) References Cited

U.S. PATENT DOCUMENTS

| | | |
|---|---|---|
| 2011/0239858 A1* | 10/2011 | Slot .......................... F01L 3/04 219/121.64 |
| 2015/0144826 A1 | 5/2015 | Bayyouk et al. |
| 2016/0208930 A1 | 7/2016 | Bell et al. |

* cited by examiner

FLUID END WITH INTEGRATED VALVE SEAT

CROSS-REFERENCE TO RELATED APPLICATION

This Application is a National Stage Entry of, claims priority to, and claims the benefit of International Patent Cooperation Treaty (PCT) Application Serial No. PCT/US2019/024350 entitled "Fluid End with Integrated Valve Seat," filed on Mar. 27, 2019, which claims priority to and the benefit of U.S. Provisional Patent Application Ser. No. 62/649,436, entitled "Fluid End with Integrated Valve Seat," filed on Mar. 28, 2018, all of which are incorporated herein by reference in their entirety.

TECHNICAL FIELD

This disclosure relates in general to fluid ends for reciprocating pumps.

BACKGROUND OF THE DISCLOSURE

Large pumps are commonly used for mining and oilfield applications, such as, for example, hydraulic fracturing. During hydraulic fracturing, fracturing fluid (i.e., cement, mud, frac sand and other material) is pumped at high pressures into a wellbore to cause the producing formation to fracture. One commonly used pump in hydraulic fracturing is a high pressure reciprocating pump, like the SPM® Destiny™ TWS 2500 frac pump, the QWS2500 model, or the TWS2250 model, or other types of bull gear driven pumps or gear box driven pumps, manufactured by S.P.M. Flow Control, Inc. of Fort Worth, Tex.

In operation, the fracturing fluid is caused to flow into and out of a pump fluid chamber as a consequence of the reciprocation of a piston-like plunger respectively moving away from and toward the fluid chamber of a fluid end. As the plunger moves away from the fluid chamber, the pressure inside the chamber decreases, creating a differential pressure across an inlet valve, drawing the fracturing fluid through the inlet valve into the chamber. When the plunger changes direction and begins to move toward the fluid chamber, the inlet valve is shut and the pressure inside the chamber substantially increases until the differential pressure across an outlet valve causes the outlet valve to open, enabling the highly pressurized fracturing fluid to discharge through the outlet valve into the wellbore. The fluid end provides structural support for the inlet valve, the outlet valve, and the connection with the plunger.

Because of extreme operating conditions such as the high speed fluid flow, the high operating pressures (oftentimes up to 15,000 psi), and the abrasive solid particles associated with the fracturing fluid, the mating surfaces on valves and valve seats tend to wear at a rapid rate, and thus, the valves and valve seats must be replaced at frequent intervals before the whole fluid end needs replacement. This cause high maintenance upkeep for running the fluid end.

For example, field servicing and replacement of valve seats is time consuming and cumbersome. Since valve seats are typically press fitted into the fluid end, specialized equipment, including equipment having complex hydraulic system arrangements, are required to extract the valve seat. Once the seat is extracted, a new seat is positioned inside the fluid end and then pressed in place. This process is typically repeated every 2 to 3 days, however, it is not uncommon for this to occur multiple times in a single day. The frequency of replacement depends on multiple factors including, for example, the fracking media, hours of operation, etc.

If, however, valve seat replacement requirement could be eliminated, significant savings could be realized. These savings would be the result of eliminating of the cost of the component, required labor to conduct field servicing and a significant increase in up time (no down time needed to conduct the servicing of the seats).

SUMMARY

This disclosure presents a pump body, such as a fluid end housing used in a reciprocating pump, which provides an integral seating or engagement surface for a valve member. The integral engagement surface removes the need for a separate, replaceable valve seat and can last as long as the service life of the fluid end housing. This saves multiple maintenance services during the service life of the fluid end housing, along with the associated down time, labor costs, and material costs for the new valve seats. The integral engagement surface thus performs as an integral valve seat to the pump body. In some embodiments, the integral engagement surface may be coated, cladded, heat-treated, or otherwise modified to increase its wear resistance, such as by including one or more wear-resistant inserts to at least partially contact the valve member. The specific treatment or application of wear-resistant insert may depend on the building cost as well as the expected service life of the fluid end housing. It is desirable to have the components installed with the pump body having a similar duration of service life before replacement of the whole unit.

In a first general aspect, a fluid end is operable to discharge fluids from a first side to a second side. The fluid end includes a pump body that has an inlet channel on the first side, an outlet channel on the second side, and a chamber connecting the inlet to the outlet. The pump body further includes a pressure variation channel in fluid connection with the chamber. An engagement surface formed integral with the pump body in the inlet channel or the outlet channel. The fluid end includes a valve member such that the engagement surface is sealable with the valve member. The valve member is reciprocatably movable into and out of engagement with the engagement surface.

In a specific aspect, the fluid end further includes an insert forming at least a portion of the engagement surface. The insert may be more wear resistant than the pump body. For example, the pump body may include a cavity for receiving the insert at or near the engagement surface.

In some embodiments, the insert is formed of a ceramic material, such as tungsten carbide, ceramics, zirconia, heat treated stainless steel, or a particular grade of steel. In some embodiments, the insert may include cladding.

In another specific aspect, the fluid end further includes a second engagement surface formed integral with the pump body such that each of the inlet channel and the outlet channel includes one of the first or the second engagement surface.

In yet another specific aspect, the fluid end further includes a valve spring biasing the valve member toward the engagement surface into a sealing engagement configuration. The fluid end may also include an adaptor connecting the pressure variation channel to a packing assembly and a plunger configured to reciprocate in the packing assembly to produce a pressure variation actuating the valve member to disengage the engagement surface and actuating fluids to flow through the chamber.

In some embodiments, the fluid end further includes a suction cover sealing an access channel extending from the chamber. The suction cover may be opposite to the pressure variation channel. The access channel is sized to allow for assembly of and access to the plunger.

In a second general aspect, this disclosure presents a fluid end body. The fluid end body may include a first external surface facing toward a power end of a pump assembly, a second external surface opposite the first external surface, and a first through channel extending between the first external surface and the second external surface. The fluid end body may also include a third external surface facing toward a supply of fluids, a fourth external surface facing toward a discharge of fluids, the fourth external surface opposite of the third external surface, and a second through channel extending between the third external surface and the fourth external surface. The second through channel may be crossing the first through channel. The second through channel includes a first integral engagement surface for receiving a first valve member. The engagement surface may be sealable with the valve member when the valve member is pressed against the engagement surface.

In one specific aspect, the second through channel may further include a second engagement surface configured to receive a second valve member.

In another specific aspect, the fluid end body further includes an insert forming at least a portion of the first engagement surface. In some embodiments the insert is more wear resistant than the fluid end body. In some embodiments, the insert is made of one or more of tungsten carbide, ceramics, zirconia, or heat treated stainless steel.

In some implementations, the insert may include one or more steps for fitting inside the engagement surface of the fluid end body. The fluid end body may include a stepped cavity for receiving the one or more steps of the insert.

In some other implementations, the insert may include two or more annular inserts spaced apart and fitted inside corresponding grooves in the fluid end body.

In yet some other implementations, the insert may fit inside a cavity of the fluid end body. The cavity including a bottom wall and a side wall.

In some implementations, the insert may be formed of three separate and different materials.

In some other implementations, the insert may include a plurality of radial segments.

In yet some other implementations, the insert may extend inside the second through channel and configured to be in contact with one or more legs of the valve member. In some embodiments, the insert may include two separable sections, one for providing the engagement surface, the other may provide vertical contact surfaces with the one or more legs of the valve member.

In a third general aspect, a method is disclosed for providing an engagement surface for sealing a valve member absent a separate valve seat. The method includes providing a through bore connecting a fluid inlet to a fluid outlet in a pump body; and preserving an engagement surface for receiving a valve member.

In some specific aspects, the method further includes machining a cavity in the engagement surface; and inserting an insert into the cavity to supplement the machined portion of the engagement surface, wherein the insert is more wear resistant than the pump body.

Other aspects, features, and advantages will become apparent from the following detailed description when taken in conjunction with the accompanying drawings, which are a part of this disclosure and which illustrate, by way of example, principles of the inventions hereof.

DESCRIPTION OF THE FIGURES

The accompanying drawings facilitate an understanding of the various embodiments.

Like elements are labeled using like numerals.

DETAILED DESCRIPTION

Figure 1:
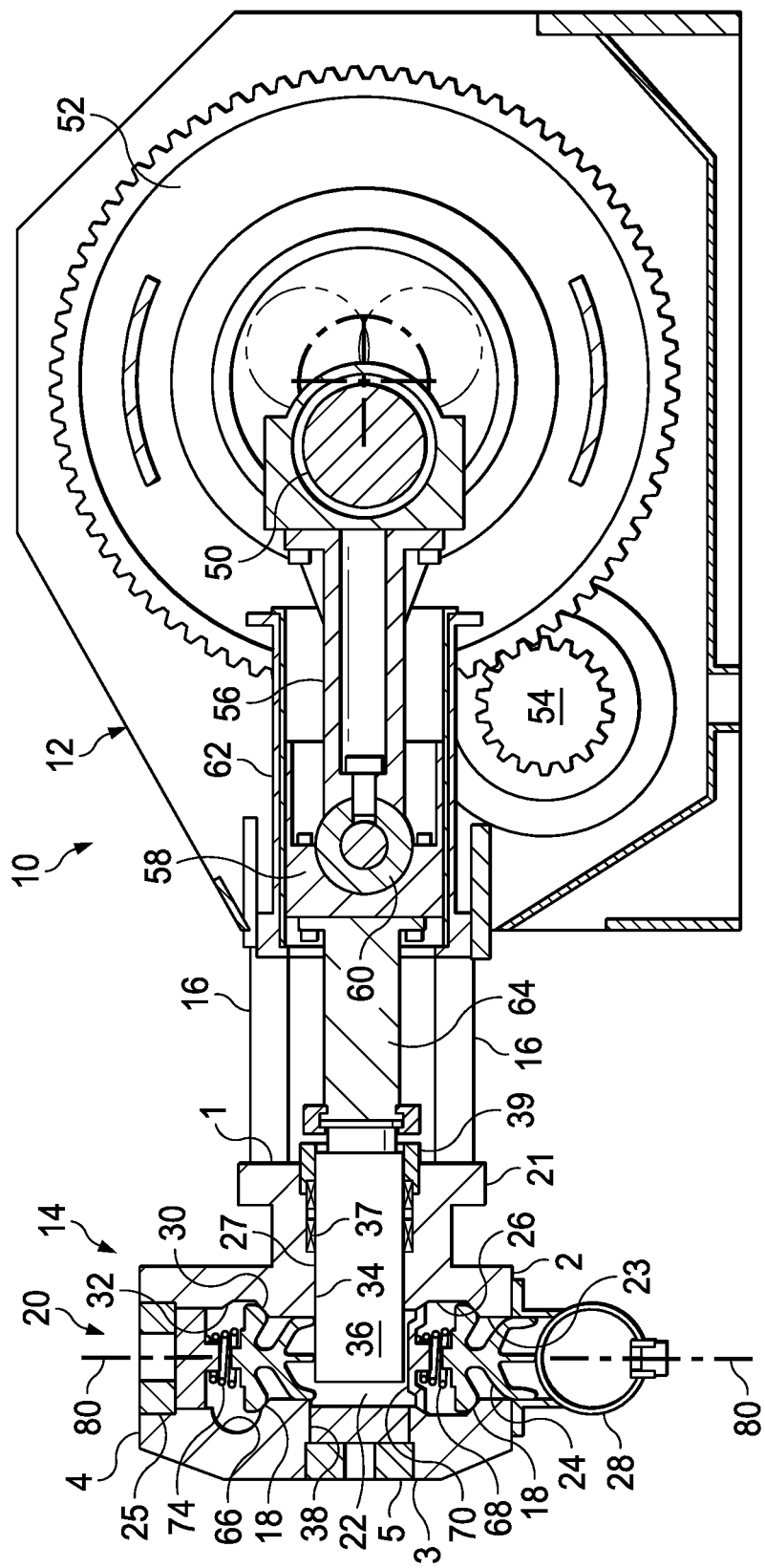
FIG. 1 is a cross sectional side view of a reciprocating pump assembly having a power end coupled to a fluid end incorporating valve assemblies in which an integrated valve seat is employed to advantage.

FIG. 1 is an illustration of a reciprocating pump assembly 10 having a crankshaft housing 12 (e.g., a power end) operatively coupled to a fluid section 14 (e.g., a fluid end) via a plurality of stay rods 16, the assembly 10 effective to pump fluid through a fluid end housing 20. The fluid end housing 20 is configured to enclose valves and plungers to transfer fluids. The fluid end housing 20 is formed by a solid pump body 21. The pump body 21 includes a power end surface 1 facing the crankshaft 50, a source end surface 2 facing the suction manifold 28, an access external surface 3 enabling maintenance access, and a discharge end surface 4. The suction manifold 28 provides a supply of fluids to be transferred by the fluid section 14. In the embodiment illustrated in FIG. 1, the fluid section 14 is employs one or more integrated valve seats 18 (i.e., a valve seat formed as part of the pump body 21 of the fluid end housing 20), which as discussed in further detail below, are operable to eliminate the need for a removable valve seat. Each integrated valve seat 18 may include an integral engagement surface formed by the pump body 21 for receiving a valve member, such as the valves 24 and 30 shown.

The fluid end housing 20 includes one or more inlet channels 23, outlet channels 25, pressure variation channels 27, and fluid chambers 22 (only one shown at the cross section, but multiple units may be formed in the direction into or out of the page). In particular, the fluid end housing 20 typically includes a suction valve 24 in a suction bore 26 that draws fluid from within a suction manifold 28, a discharge valve 30 in a discharge bore 32 to control fluid output, a plunger bore 34 for housing a reciprocating plunger 36, and an access bore 38 to enable or otherwise facilitate access to the plunger bore 34. The access bore (or channel) 38 may be sealed using a suction cover 5. The access bore 38 may be sized to allow for assembly of and access to the plunger 36. The plunger bore 34 forms the pressure variation channel 27 therein. In some embodiments, the pump body 21 receives an adaptor 39 at the plunger bore 34. The adaptor 39 connects the pressure variation channel 27 to a packing assembly 37 or any equivalent seal thereof to seal with the plunger 36. In common embodiments, the suction valve bore 26, the discharge valve bore 32, the plunger bore 34 and the access bore 38 generally intersect in the vicinity of the fluid chamber 22.

In the embodiment illustrated in FIG. 1, the pump assembly 10 is positionable to be free-standing on the ground, mounted to a trailer that can be towed between operational sites, and/or mounted, for example, to a skid for use in offshore operations. Although FIG. 1 illustrates a specific type of pump, other different pumps may be used with different configurations or use different components as described below.

Referring specifically to the crankshaft housing 12, a crankshaft 50 is rotated by a bull gear 52, which is engaged with and driven by a pinion gear 54. A power source, such as an engine (not shown), connects to and rotates the pinion gear 54 during operation. A connecting rod 56 mechanically connects the crankshaft 50 to a cross head 58 via a wrist pin 60. The crosshead 58 is mounted within a stationary crosshead housing 62, which constrains the crosshead 58 to linear reciprocating movement. A pony rod 64 connects to the crosshead 58 and has its opposite end connected to the plunger 36 to enable reciprocating movement of the plunger 36, as discussed in further detail below. In the embodiment illustrated in FIG. 1, the plunger 36 may be one of a plurality of plungers, such as, for example, three or five plungers, depending on the size of the pump assembly 10 (i.e., three cylinder, five cylinder, etc.).

As illustrated in FIG. 1, the plunger 36 extends through the plunger bore 34 so as to interface and otherwise extend within the fluid chamber 22. In operation, the valves 24 and 30 are actuated by a predetermined differential pressure inside the fluid chamber 22. The suction valve 24 actuates to control fluid flow through the suction manifold 28 into the fluid chamber 22, and the discharge valve 30 actuates to control fluid flow through a discharge port 66 from the fluid chamber 22. In particular, movement of the crankshaft 50 causes the plunger 36 to reciprocate or move longitudinally toward and away from, the fluid chamber 22. As the plunger 36 moves longitudinally away from the chamber 22, the pressure of the fluid inside the fluid chamber 22 decreases, which creates a differential pressure across the suction valve 24. In the embodiment illustrated in FIG. 1, a biasing member 68 (e.g., a spring) is located between the suction valve 24 and a valve stop 70. The biasing member 68 maintains a predetermined pressure on the suction valve 24 thereby maintaining the suction valve 24 in a closed position until the differential pressure across suction valve 24 is sufficient to overcome the force generated by the biasing member 68. The pressure differential within the chamber 22 enables actuation of the valve 24 to allow the fluid to enter the chamber 22 from the suction manifold 28. The pumped fluid is drawn within the fluid chamber 22 as the plunger 36 continues to move longitudinally away from fluid chamber 22 until the pressure difference between the fluid inside the chamber 22 and the fluid pressure inside the suction manifold 28 is small enough for the suction valve 24 to move to its closed position (via the biasing mechanism 68 and/or pressure within the chamber 22). As the plunger 36 changes directions and moves longitudinally toward the fluid chamber 22, the fluid pressure inside the chamber 22 gradually increases. Fluid pressure inside the chamber 22 continues to increase as the plunger 36 approaches the end of its cycle (i.e., the top dead center) until the differential pressure across the discharge valve 30 is large enough to actuate the valve 30 (thereby compressing a biasing member 74). This enables pumping fluid to exit the chamber 22 via the discharge port 66.

Briefly, in the embodiment illustrated in FIG. 1, the fluid end housing 20 includes the suction valve bore 26 and the discharge valve bore 32 aligned along a centerline or axis 80. For ease of explanation, the following discussion will refer to the suction valve 24 and the suction valve bore 26; however, it should be understood that a similar structure and the same principles apply to the discharge valve 30 and the discharge valve bore 32. Referring specifically to the suction valve bore 26 in FIG. 2, the suction valve bore 26 has an inclined/conical seating surface 100 that extends from an inner wall portion 102 to an outer wall portion 104. In the embodiment illustrated in FIG. 2, the conical contour of seating surface 100 is disposed at an angle 106, which is relative to a plane 108 that is perpendicular to the central axis 80, and which in the embodiment shown also corresponds to the angle of a contact surface 110 on the valve member 112. The angle 106 is provided preferably in one embodiment from about 20 degrees to about 60 degrees. In other embodiments, the angle 106 is from about 30 degrees to about 40 degrees, from about 30 degrees to about 35 degrees, from about 35 degrees to about 45 degrees, from about 35 degrees to about 40 degrees, from about 40 degrees to about 45 degrees, greater than 30 degrees, or less than 45 degrees; however, the range of the angle 106 may vary. In some embodiments, the seating surface 100 is formed of a hardened steel to eliminate and/or otherwise substantially reduce damage (i.e., general wear and pitting) caused from abrasive solid particles associated with the fracturing fluid and the high operating pressures and fluid flow.

Figure 2:
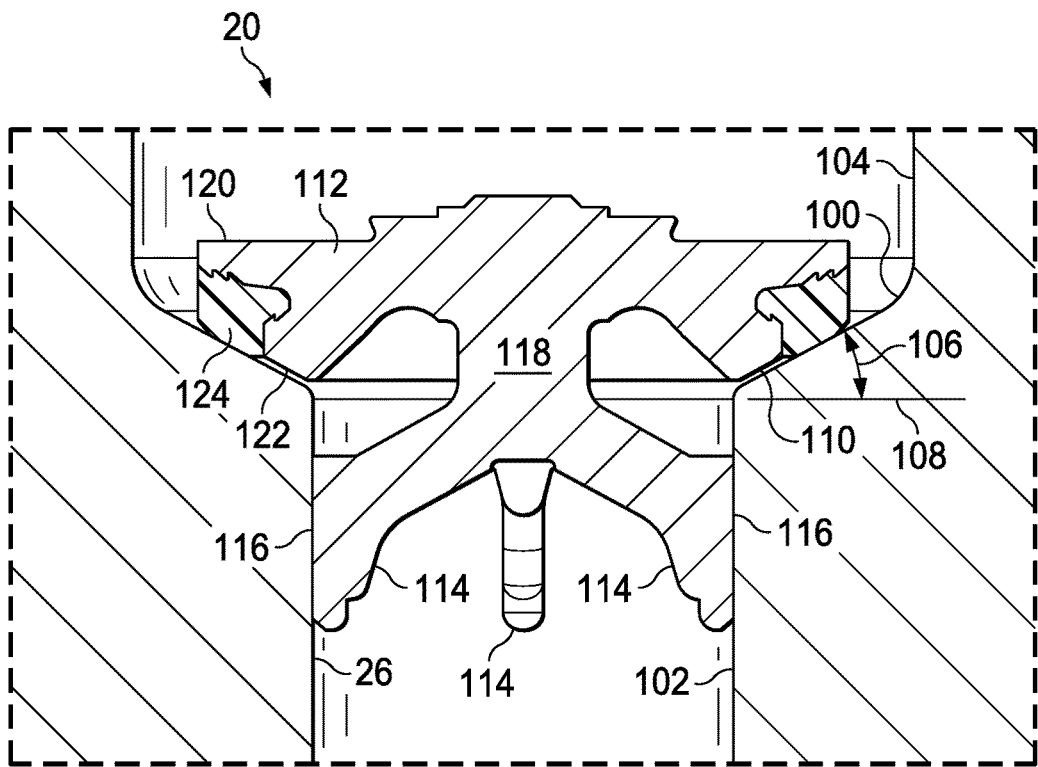
FIG. 2 is a detail cross sectional side view of an embodiment of a valve assembly of FIG. 1 in which an integrated valve seat is employed to advantage.

With continued reference to FIG. 2, the suction valve 24 comprises the seating surface 100 of the suction bore 26 and the valve member 112. According to some embodiments, the valve member 112 is formed of metal (such as cast steel or other metal machined, forged, or otherwise made into desired shape having desired strength) is reciprocatably movable between an open position (i.e., the valve member 112 is spaced apart from the seating surface 100), and a closed position (i.e., the valve member 112 mates with and otherwise engages the seating surface 100) in response to differential pressure within the pump.

In the embodiment illustrated in FIG. 2, the valve member 112 includes three legs 114 having outer ends 116 slideably engaging the inner sidewall 102 of the suction bore 26. In other embodiments, the valve member 112 may have more or less number of legs, such as four legs, or two, depending on other constraints such as cost, weight, and strength. The legs 114 are secured to or otherwise integral with a central stem 118, which extends upwardly along the central axis 80 to an upper valve body portion 120. In the embodiment illustrated in FIG. 1, an upper valve body portion 120 flares radially outward from the stem 118 and forms the downwardly and outwardly-facing annular seal/contact surface 110. In the embodiment illustrated in FIG. 2, the valve body portion includes a seal insert 124 for sealingly engaging the inclined seating surface 100. According to some embodiments, the seal insert 124 is formed of a conventional thermoplastic material including, for example, urethane. This particular configuration of the sealing surface 100 extending between the inner and outer surfaces 102 and 104 enable the fluid end housing to be operable without requiring a detachable/removable valve assembly.

Figure 3:
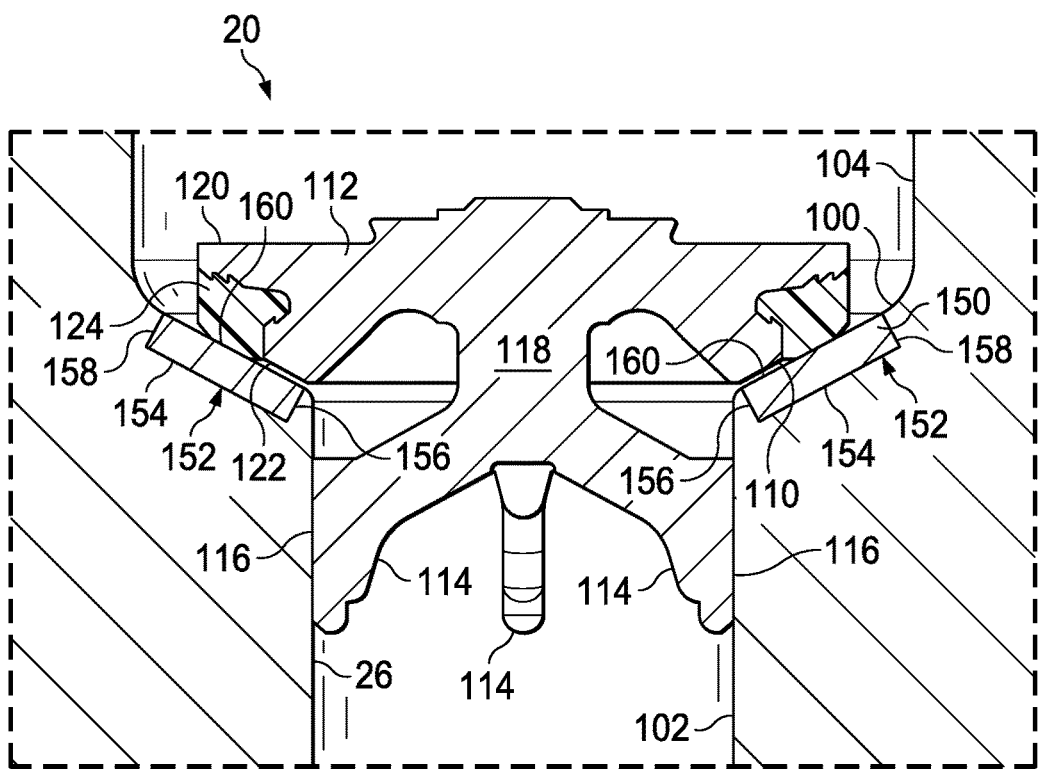
FIG. 3 is a detail cross sectional side view of another embodiment of an integrated valve seat of the fluid end of FIG. 1.

Referring now to FIG. 3, an alternate exemplary embodiment of the fluid end housing 20 in which an insert member 150 is employed to advantage on the inclined seating surface 100. The insert member 150 may be made of a more wear resistant material than the pump body 21. In the embodiment illustrated in FIG. 3, the insert 150 forms at least a portion of the seating surface 100 on the fluid end housing 20. According to some embodiments, the insert 150 is formed of a ceramic material, although it should be understood that any other suitable material able to withstand or is otherwise resistant to wear and impact can be used. In an exemplary, non-limiting embodiment, the material may be a ceramic such as zirconia, partially stabilized zirconia, a tungsten carbide such as a tungsten carbide nickel, or tungsten carbide cobalt, titanium carbide, silicon nitride, or sialon. In certain embodiments, the material may be a refractory material such as oxides of aluminum, silicon, and/or magnesium. In use, the ceramic insert 150 extends the life span of the inclined seating surface 100, and thus, the fluid end housing 20 by resisting or otherwise reducing corrosion, erosion, and/or pitting on the seating surface 100.

According to some embodiments, the hardness of the ceramic material ranges from about 12 to 22 GPa with reference to the Vickers hardness number, and the hardness the ceramic insert 150 being harder than other surrounding areas. For example, the seating surface 100 includes the ceramic insert 150 having the hardness that is greater than a hardness of the adjacent seating surface 100 material or of the contact surface of the valve body 120, which may include the seal insert 124. In one embodiment, the seating surface 100 and the valve member 112 are formed from steel with the insert 150 formed from a ceramic.

In the embodiment illustrated in FIG. 3, the insert 150 spans along a substantial portion of the integrated seating surface 100 of the fluid end housing 20. The insert 150 is illustrated disposed within a cavity 152 formed in the seating surface 100 by bottom wall 154 and sidewalls 156 and 158. In one embodiment, the depth of the cavity 152 and/or the thickness of the insert 150 is such that a contact surface 160 of the insert 150 is flush with the surrounding seating surface 100, however, the depth of the cavity 152 and/or thickness of the insert 150 may vary such that the contact surface 160 is above or below the seating surface 100.

In some embodiments, the insert 150 is fitted into the cavity 152 by a press-fit, shrink-fit, bonding, adhesion, sintering, welding, or combinations thereof. In other embodiments, the ceramic material is a coating applied by dipping or spraying. In some embodiments, the insert 150 may be made of ceramic powders and sintered inside the cavity 152. In other embodiments, the insert 150 may be fitted to the cavity 152 by staking, bolted in place or otherwise fastened into place, or threaded in place by having corresponding threads in an outer diameter of the insert 150 and threads in an inner diameter of the cavity when the insert is annular in some implementations. In some other embodiments, magnetism may be used to secure the insert 150 into the cavity 152.

Figure 4:
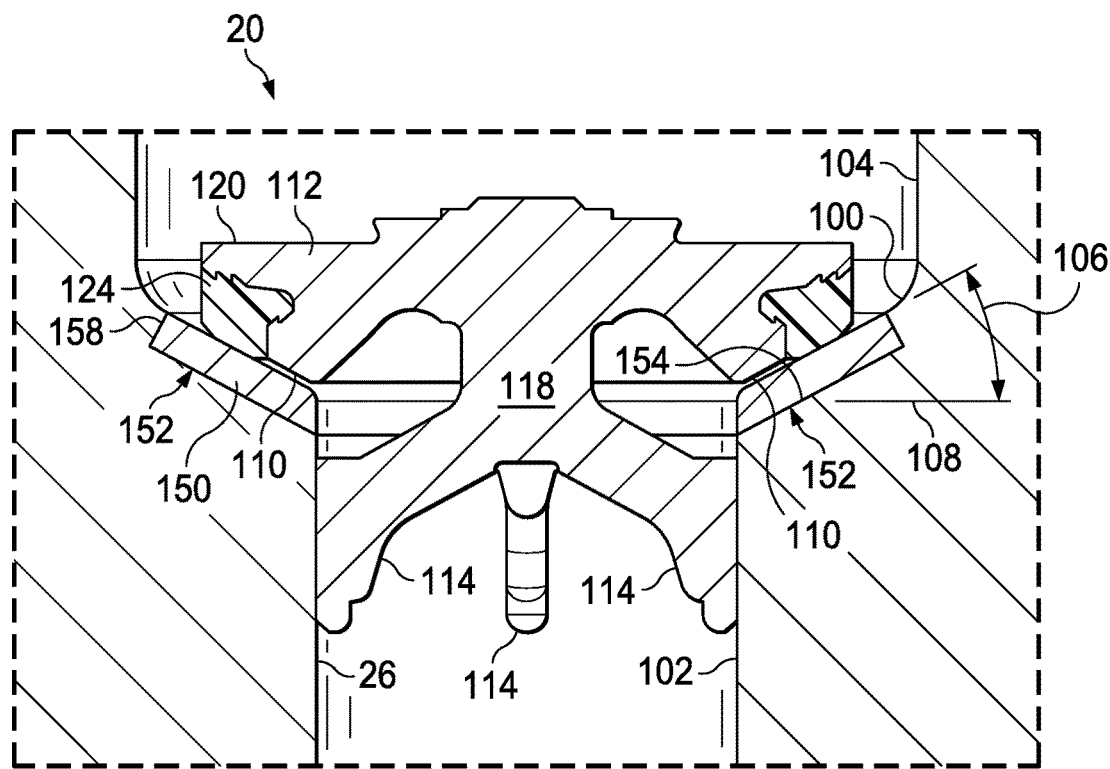
FIG. 4 is an illustration of another embodiment of an integrated valve seat of the fluid end of FIG. 1.

Referring now to FIGS. 4-10, various alternative configurations of the integrated inclined seating surface 100 are illustrated. Referring specifically to FIG. 4, the insert 150 is positioned in a cavity 152 on the seating surface 100 such that the insert 150 is surrounded and supported by only bottom wall 154 and sidewall 158. As such, a sidewall of the insert 150 forms a portion of the suction bore 26, and in particular, the inner wall portion 102.

Figure 5:
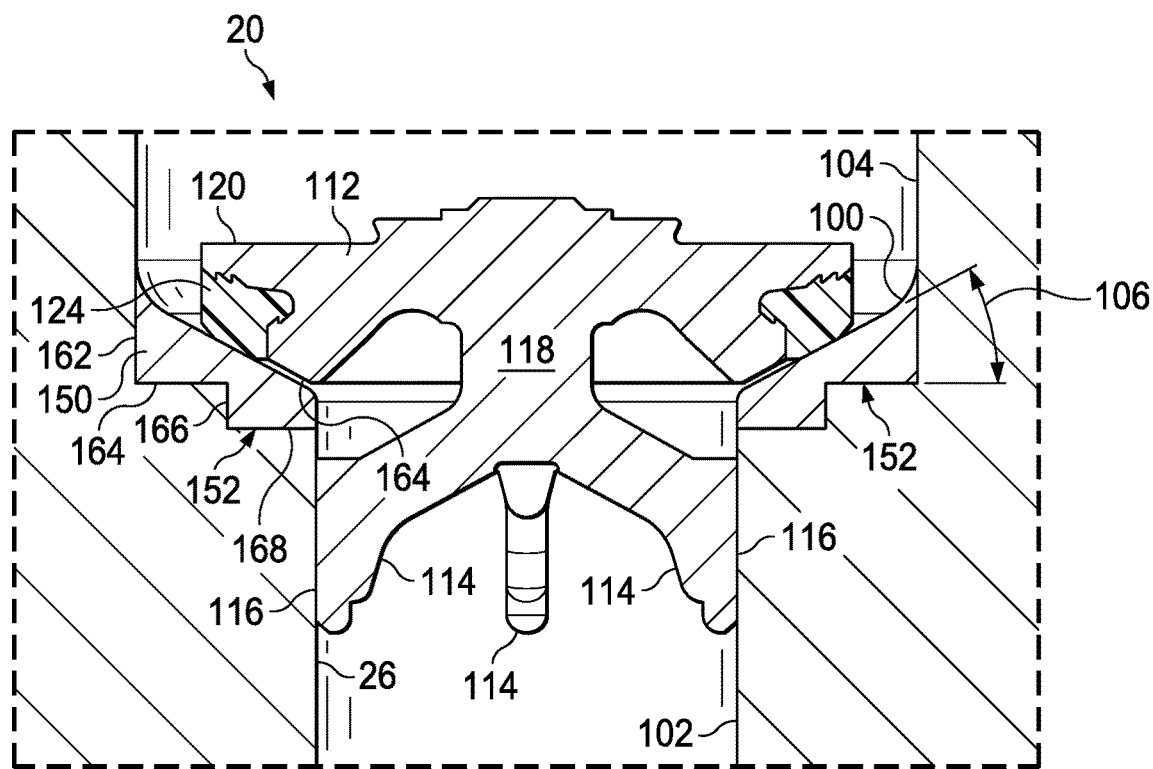
FIG. 5 is an illustration of yet another embodiment of an integrated valve seat of the fluid end of FIG. 1.

Referring now to FIG. 5, the cavity 152 is formed having a "stepped" bottom wall 154. In particular, the cavity 152 includes a sidewall 162 and stepped bottom wall portions 164 and 166 so as to receive the insert 150 therein. In the embodiment illustrated in FIG. 5, there are two "steps" 164, 166 and 168 forming the bottom wall, however, it should be understood that a greater numbers of steps can be formed. In addition, it should be understood that the entire seating surface 100 is formed by the insert 150; however, in other embodiments, the insert need not expand across the entire width of the seating surface 100.

Figure 6:
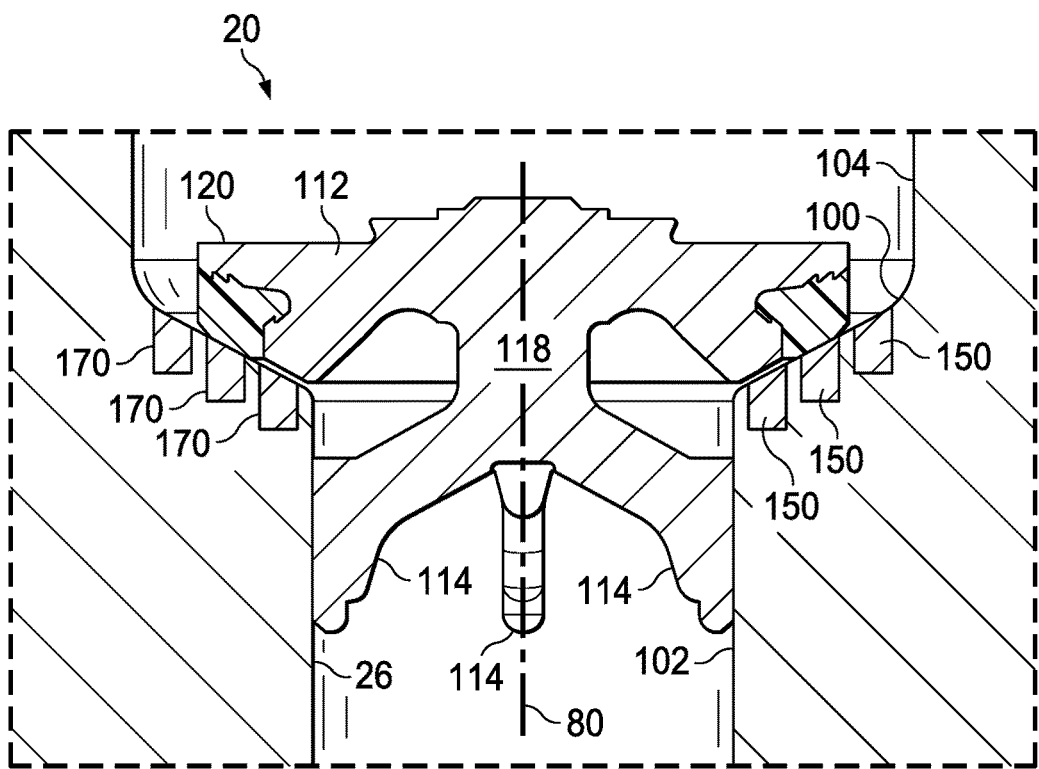
FIG. 6 is an illustration of another embodiment of an integrated valve seat of the fluid end of FIG. 1.

FIG. 6 illustrates another embodiment in which a plurality of grooves 170 are formed within the seating surface 100 to received respective annular inserts 150 therein. The annular inserts 150 are spaced apart and fitted inside the corresponding grooves 170 in the pump body 21 of the fluid end. As illustrated in the embodiment in FIG. 6, three spaced apart grooves 170 are concentrically disposed around the axis 80. As illustrated, each insert 150 is formed having a generally rectangular cross sectional area; however, it should be understood that the cross sectional shape of the inserts 150 can be any shape or dimension, such as, for example, longer, shorter, wider, narrower, square shaped, wedge shaped, "I-beam" shaped, semicircular, etc. or any combination thereof. In addition, a greater or fewer number of spaced apart grooves 170, and thus inserts, may be utilized.

Figure 7:
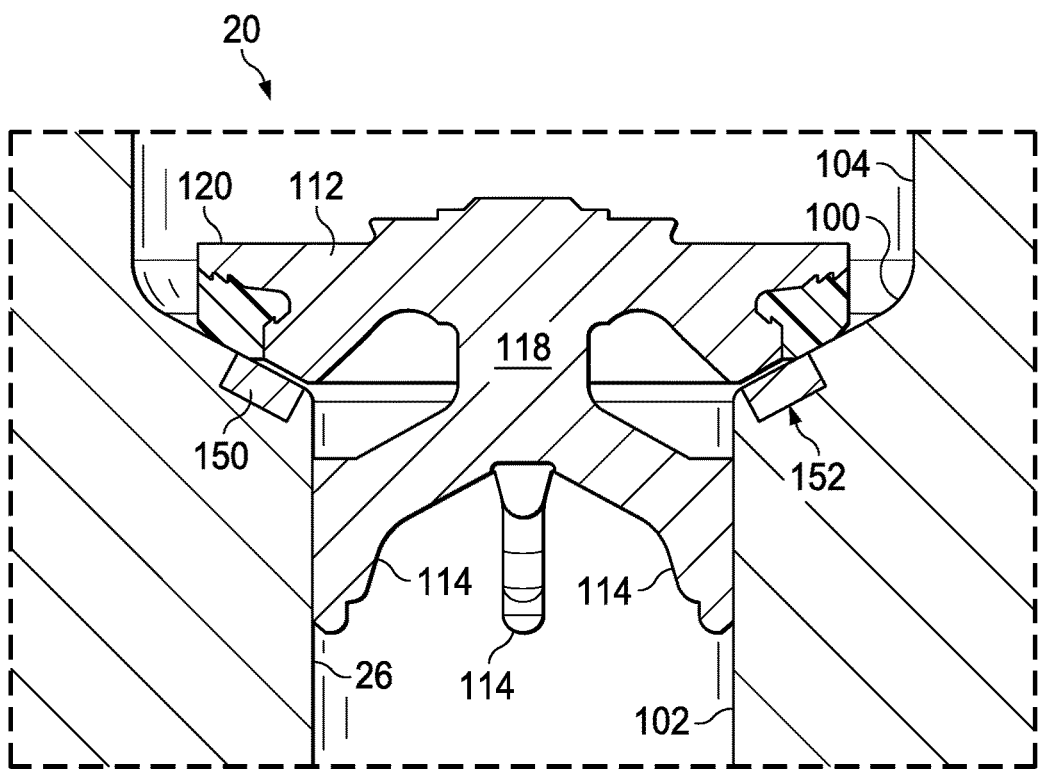
FIG. 7 is an illustration of still another embodiment of an integrated valve seat of the fluid end of FIG. 1.

FIG. 7 illustrates another embodiment of a fluid end housing 20 in which an integrated seating surface 100 is employed to advantage. In the embodiment illustrated in FIG. 7, a cavity 152 is formed generally adjacent and/or otherwise near the inner wall portion 102 of the suction bore 26 and is generally aligned with the metallic portion of the contact surface 110 of the valve member 112. It should be understood that the cavity 152 may be otherwise positioned, such as, for example, formed generally adjacent and/or otherwise near the outer wall portion 104 and/or generally aligned with the seal insert 124.

Figure 8:
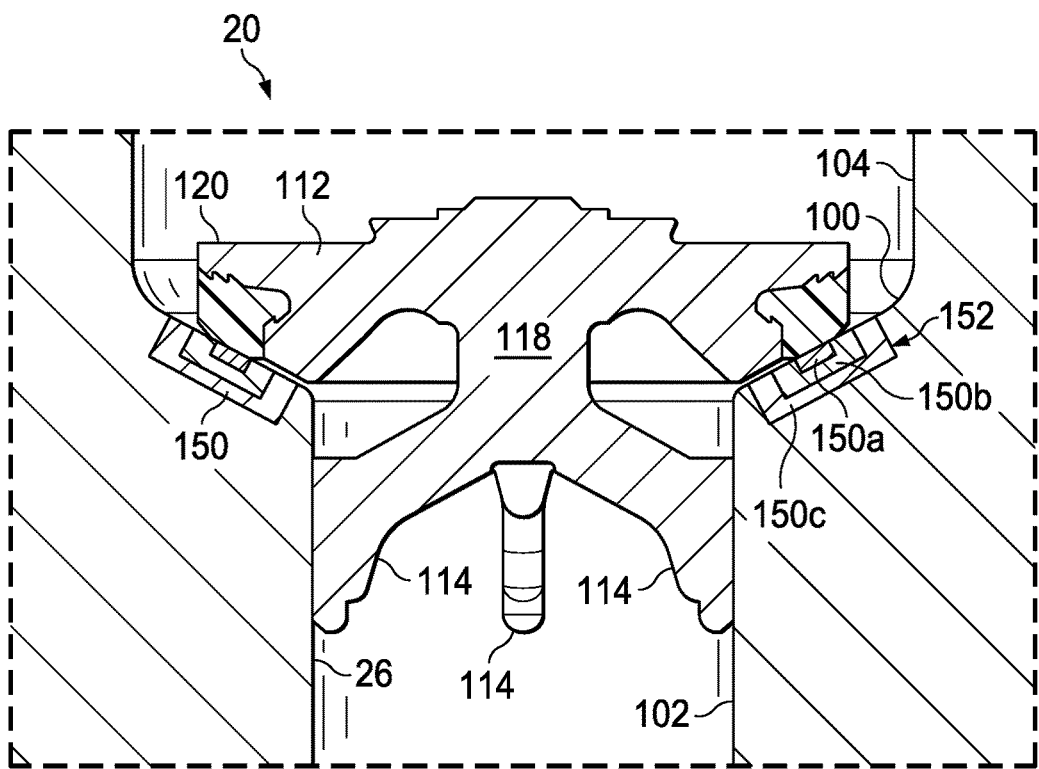
FIG. 8 is an illustration of yet another embodiment of an integrated valve seat of the fluid end of FIG. 1.

Referring now to FIG. 8, there is illustrated a multi-material insert 150 formed of three separate materials 150a, 150b and 150c, each having a differing hardness. For example, material 150a may be formed of steel, material 150b may be formed of tungsten carbide, and material 150c may be formed of zirconia, all chosen and sized to increase the life of the seating surface 100. It should be understood that any combination of materials, sizes and/or shapes forming the insert 150 may be utilized.

Figure 9:
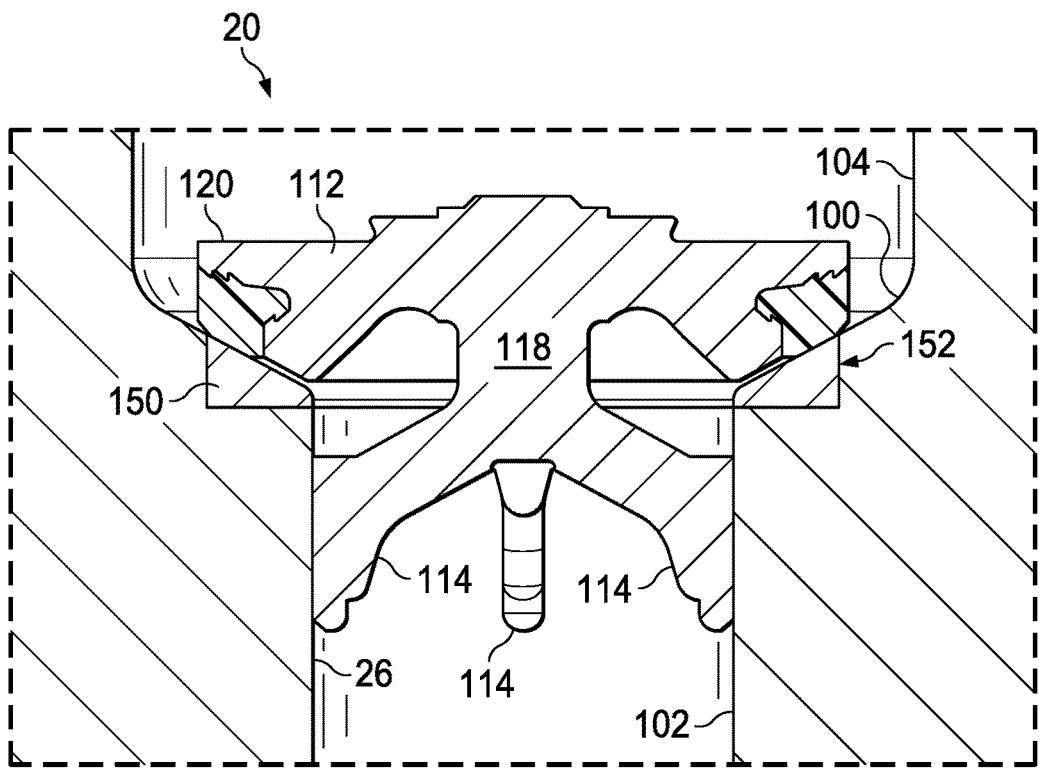
FIG. 9 is an illustration of yet another embodiment of an integrated valve seat of the fluid end of FIG. 1.

FIG. 9 illustrates an insert 150 having a triangular cross-sectional shape disposed within the cavity 152 at or near the inner wall portion 102. It should be understood that the insert 150 may be otherwise positioned, such as at or near the outer wall portion 102 and may be larger or smaller, depending on the desired configuration.

Figure 10:
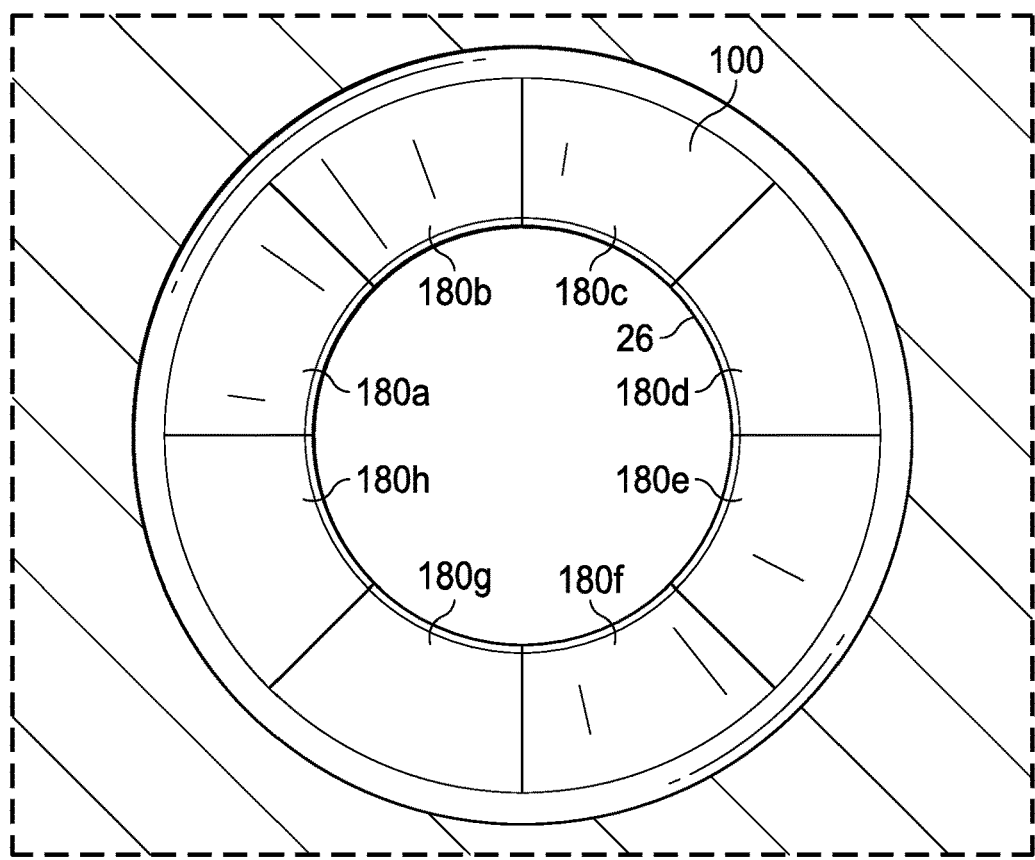
FIG. 10 is a top plan view of a seating surface of an integrated valve seat.

FIG. 10 illustrates yet another embodiment of the seating surface 100. In the embodiment illustrated in FIG. 10, the seating surface 100 is formed having segmented inserts 180a-180h (e.g., each insert is a radial segment) disposed generally around the suction bore 26. As illustrated, each insert 180a-180h is a separate generally pie-shaped piece that are positioned adjacent to each other to form the seating surface 100. It should be understood that a greater or fewer number of pie-shaped piece may be utilized. In addition, each insert 180 may be alternated between a portion of the seating surface 100 of the fluid end housing 20. For example, insert 180a, 180c, 180e and 180g may be formed of a ceramic material disposed between pie-shaped portions 180b, 180d, 180f and 180h formed on the seating surface of the fluid end housing 20.

Figure 11:
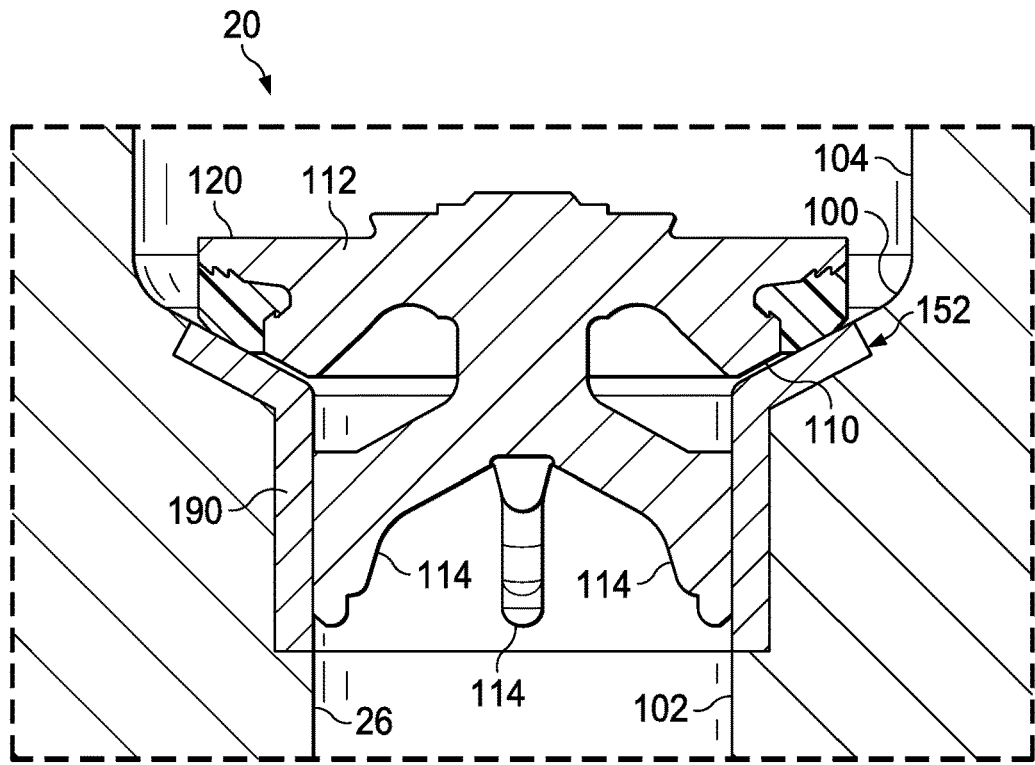
FIG. 11 is an embodiment of an insert for an integral engagement surface formed by the pump body of the fluid end of FIG. 1.

Referring now to FIG. 11, there is provided an insert 190 forming, in addition to a portion of the seating surface 100, a portion of the suction bore 26 such that during operation, the valve legs 114 slideably engage the insert 190 to reduce wear and otherwise increase the operating life of the suction bore 26. Similar to previous discussions, for ease of explanation, reference to FIG. 11 will be limited to the suction bore 26, however, it should be understood that similar configurations can be utilized in the discharge valve bore 32.

In FIG. 11, the insert 190 is illustrated as a single contiguous part forming a portion of the seating surface 100 and the suction bore 26; however, it should be understood that it may be otherwise configured, such as formed by two or more separable pieces. For example, the insert 190 may only form part of the suction bore 26 (and not form any portion of the seating surface 100). It should also be understood that in some embodiments, the insert 190 may extend the entire length and cover an entire portion of the suction bore 26 or may cover less of the suction bore. According to some embodiments, the insert 190 is a ring-like member extending circumferentially around the bore 26 or, alternatively, may be adjacently positioned segments or spaced apart segments disposed therein. In still other embodiments, the inserts 190 may be located at spaced apart positions aligned with each leg 114 for sliding engagement therewith.

According to embodiments disclosed herein, the inserts 150, 180 and 190 are secured, for example, by bonding, press-fitting, shrink-fitting, sintering, welding, or combinations thereof. In some embodiments, the thickness of the insert 150 is between about 1/32 inches to about 1/2 inches. In other embodiments, the insert 150 is a coating that is applied by spraying, having a thickness between about 1/32 inches and 1/2 inches, however, such thicknesses may vary.

As discussed in greater detail below, the insert 150 is formed of different shapes and sizes. In certain embodiments, the insert 150 is positioned in areas of high erosion and pitting. The size, shape, and placement of the insert 150 depends on the operational environment. Likewise, variances in operational, ambient, or environmental temperatures, along with the operational forces applied to and/or otherwise acting on the insert 150 (e.g., the tensile and compressive forces) may affect the size, shape or placement of the insert 150.

Furthermore, while in certain embodiments, valve assemblies have been described herein to operate in conjunction with reciprocating pumps in the presence of highly abrasive fluids, such as fracturing fluids, it is to be understood that many other applications for said valve assemblies lie within the scope of the invention. For example, the valve assemblies can be used in pumps pumping drilling fluid directly into the well bore, mining slurry through a pipeline, in pumps that are used to plump fluid with fluid particulars, or in applications other than pumps.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In the specification and claims, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A fluid end for discharging fluids from a first side to a second side, the fluid end comprising:
   a monolithic pump body including:
   an inlet channel on the first side,
   an outlet channel on the second side,
   a chamber connecting the inlet channel to the outlet channel, and
   a pressure variation channel in fluid connection with the chamber;
   a valve member; and
   an engagement surface formed in an interior surface of the monolithic pump body in the inlet channel or the outlet channel,
   the engagement surface being sealable with the valve member, and
   the valve member being reciprocatably movable into and out of engagement with the engagement surface.

2. The fluid end of claim 1, further comprising:
   an insert forming at least a portion of the engagement surface, wherein the insert is more wear resistant than the monolithic pump body.

3. The fluid end of claim 1, wherein at least a portion of the interior surface of the monolithic pump body is sealable with the valve member.

4. The fluid end of claim 1,
   wherein the engagement surface is a first engagement surface in the inlet channel, and
   wherein the fluid end further comprises a second engagement surface in the outlet channel.

5. The fluid end of claim 1, further comprising:
   a valve spring biasing the valve member toward the engagement surface into a sealing engagement configuration; and
   an adaptor connecting the pressure variation channel to a packing assembly and a plunger configured to reciprocate in the packing assembly to produce a pressure variation actuating the valve member to disengage the engagement surface and actuating fluids to flow through the chamber.

6. The fluid end of claim 1, further comprising:
   a suction cover sealing an access channel extending from the chamber,
   the suction cover being opposite to the pressure variation channel.

7. The fluid end of claim 6, wherein the access channel is sized to allow for assembly of and access to a plunger.

8. A fluid end body, comprising:
- a first external surface,
  - wherein the fluid end body is monolithic;
- a second external surface opposite the first external surface;
- a first through channel extending between the first external surface and the second external surface;
- a third external surface facing toward a supply of fluids;
- a fourth external surface facing toward a discharge of fluids, the fourth external surface opposite of the third external surface; and
- a second through channel extending between the third external surface and the fourth external surface;
  - wherein the second through channel includes a first engagement surface configured to receive a first valve member,
    - the first engagement surface being embedded in an interior surface of the second through channel.

9. The fluid end of claim 1, wherein the monolithic pump body is a solid pump body.

10. The fluid end body of claim 8, wherein the second through channel further includes a second engagement surface configured to receive a second valve member.

11. The fluid end body of claim 8, further comprising:
- at least one insert forming at least a portion of the first engagement surface.

12. The fluid end body of claim 11, wherein the at least one insert includes one or more of tungsten carbide, ceramics, zirconia, or heat treated stainless steel.

13. The fluid end body of claim 11, wherein the at least one insert includes one or more steps configured to fit inside the first engagement surface.

14. The fluid end body of claim 11, wherein the at least one insert comprises two or more annular inserts spaced apart and fitted inside corresponding grooves in the fluid end body.

15. The fluid end body of claim 11, wherein the at least one insert fits inside a cavity of the fluid end body,
- the cavity including a bottom wall and a side wall.

16. The fluid end body of claim 11, wherein the at least one insert is formed of three separate and different materials.

17. The fluid end body of claim 11, wherein the at least one insert comprises a plurality of radial segments.

18. The fluid end body of claim 11, wherein the at least one insert extends inside the second through channel and is configured to be in contact with one or more legs of the first valve member.

19. The fluid end body of claim 8, wherein the fluid end body is monolithic in being solid.

20. A pump assembly, comprising:
- a crankshaft housing; and
- a fluid end housing that includes a monolithic fluid end body,
  - the monolithic fluid end body including:
    - a first external surface;
    - a second external surface opposite the first external surface;
    - a first through channel extending between the first external surface and the second external surface;
    - a third external surface facing toward a supply of fluids;
    - a fourth external surface facing toward a discharge of fluids,
      - wherein the fourth external surface is opposite of the third external surface; and
    - a second through channel extending between the third external surface and the fourth external surface;
      - wherein the second through channel includes a first engagement surface configured to receive a first valve member,
        - the first engagement surface being embedded in an interior surface of the second through channel.

\* \* \* \* \*